March 6, 1945.  A. PROCTER  2,370,913
OIL SEAL
Original Filed Jan. 24, 1942
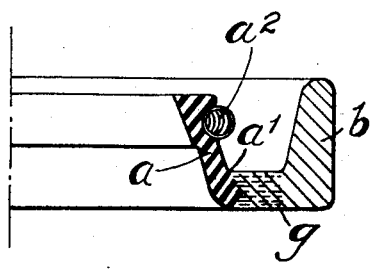
Inventor
ANTHONY PROCTER
BY Francis E. Boyce
ATTORNEY Patented Mar. 6, 1945

2,370,913

UNITED STATES PATENT OFFICE 2,370,913

OIL SEAL

Anthony Procter, Newcastle-upon-Tyne 1, England

Original application January 24, 1942, Serial No. 428,139. Divided and this application December 10, 1942, Serial No. 468,488. In Great Britain February 14, 1941

1 Claim. (Cl. 288—3)

This invention relates to oil seals, and its object is to provide devices of this kind with a firm base or holding portion possessing ample capability of elastic recovery.

Oil seals are composed of or comprise a washer of resiliently pliable material, now often oil-resisting synthetic rubber, held at one periphery directly, or in a metal casing, as a press fit in or on a machine part stationary relatively thereto, and presenting at the other periphery a, usually axially directed, sealing flange.

More particularly the object of the present invention is to provide an oil seal composed of a resilient synthetic or natural rubber (jointly hereinafter referred to as "rubber") flanged sealing portion bonded to a synthetic resin base or holding portion.

By synthetic resin is meant a synthetic resinous material which on heating to a certain temperature fuses or softens, and sets, or on cooling sets, into a hard and rigid body. Suitable materials of this kind which fuse and set irreversibly whilst still hot are for example phenol-formaldehyde and urea-formaldehyde synthetic resins. These resins are usually introduced into a mould in the form of a more or less granular powder or as tablets of compressed powder.

For the above purpose, according to the invention, an oil seal is composed of a resilient rubber sealing flange portion and a synthetic resin base or holding portion moulded by heat and set in contact with the rubber sealing flange portion.

The synthetic resin may be bonded to the rubber by fusion or softening and setting of the former in contact with the latter. However, to ensure a reliable bond between the two materials, an intertying fabric, composed for instance of a woven fabric, wire gauze or paper, or perforated sheet metal, may be embedded in the rubber and extend into and become embedded in the fused or softened synthetic resin.

The bonding of the rubber portion of an oil seal to the synthetic resin base or holding portion can be effected by enclosing the rubber portion of the oil seal in a mould having a cavity of the profile of the complete oil seal and thereafter moulding the synthetic resin base or holding portion in contact with the neck of the rubber portion, from synthetic resin moulding powder introduced into and filling the remainder of the cavity.

The mould may be first used to mould and vulcanise the rubber portion of the oil seal, whilst the portion of the cavity wherein the synthetic resin base or holding portion is subsequently moulded is occupied by an annular metal piece or pieces constituting a dummy of the profile of the base or holding portion. On completion of the moulding and vulcanising of the rubber portion, the metal dummy is removed from the mould leaving a cavity into which the synthetic resin moulding powder is introduced and in which it is fused.

It may be convenient to press and shape the rubber portion first without however vulcanising or completely vulcanising it, and to mould and set the synthetic resin simultaneously with the vulcanisation or completion of the vulcanisation of the rubber portion. The rubber in such case being practically in its finished shape, it is easy to control the exact position of the junction between the synthetic resin and the rubber. The shaping of the rubber portion may be effected in a die other than the mould in which the simultaneous curing of the rubber and synthetic resin is subsequently effected.

In the case of a one-piece or casing-less oil seal, the synthetic resin holding portion of the sealing washer is, as other one-piece oil seals, made sufficiently massive so that it can be a press fit directly in or on the machine part stationary relatively thereto.

A representative example of an oil seal in accordance with the invention is illustrated on the accompanying drawing, in half axial section.

Referring to the drawing, $a$ is the rubber sealing flange portion of an internal oil seal, and $b$ is a massive synthetic resin base or holding portion thereof. The synthetic resin portion $b$ is cast in contact with the neck $a^1$ of the rubber sealing flange portion and thus has become bonded thereto. $a^2$ is the usual garter spring.

The bond between the neck $a^1$ of the rubber sealing flange portion $a$ of the oil seal and the synthetic resin holding portion $b$ thereof, is assisted by a pack $g$ of alternate annular layers of rubber impregnated paper or other fabric and synthetic resin impregnated paper or other fabric. The rubber impregnated layers are slightly smaller in both inside and outside diameter than the synthetic resin impregnated layers, so that the layers overlap in staggered formation. Each layer extends into the same material as that with which it is impregnated.

At least part of the synthetic resin can be introduced into the mould in the form of fabric or paper impregnated with synthetic resin as an alternative to synthetic resin powder, which need then be used only at the situation where the interlock is effected.

This is a division of application Serial Number 428,139 filed January 24, 1942.

I claim:

An oil seal comprising, a flexible rubber sealing flange portion, a stout holding portion composed of moulded synthetic resin in contact with said rubber portion, and fabric impregnated with synthetic resin interleaved with fabric impregnated with rubber and embedded in said synthetic resin and extending into said rubber portion.

ANTHONY PROCTER.